(12) United States Patent
Liu et al.

(10) Patent No.: US 7,051,171 B1
(45) Date of Patent: May 23, 2006

(54) METHOD AND SYSTEM FOR PROVIDING A MULTI-CHANNEL INTERLEAVER/DEINTERLEAVER USING SDRAM

(75) Inventors: Binfan Liu, Livermore, CA (US); Zhongqiang Wang, San Jose, CA (US); Thomas Ayers, San Jose, CA (US)

(73) Assignee: BroadLogic Network Technologies, Inc., San Jose, CA (US)

( * ) Notice: Subject to any disclaimer, the term of this patent is extended or adjusted under 35 U.S.C. 154(b) by 480 days.

(21) Appl. No.: 10/412,713

(22) Filed: Apr. 11, 2003

(51) Int. Cl.
*G06F 12/00* (2006.01)

(52) U.S. Cl. .......................... 711/157; 711/127; 711/5; 345/540; 365/233; 370/509; 714/752; 714/702; 714/727

(58) Field of Classification Search .................. None
See application file for complete search history.

(56) References Cited

U.S. PATENT DOCUMENTS

| | | | |
|---|---|---|---|
| 6,035,427 A | 3/2000 | Kweon | |
| 6,058,496 A | 5/2000 | Gillis et al. | |
| 2002/0188905 A1 | 12/2002 | Hollums | |
| 2003/0103407 A1 | 6/2003 | Ooshi et al. | |
| 2005/0063421 A1 | 3/2005 | Wan et al. | |

OTHER PUBLICATIONS

Wellig, Armin, "*Two-Stage Interleaving Network Analysis To Design Area—And energy-Efficient 3GPP-Compliant Receiver Architectures*", 2004 IEEE, pp. 65-70.
Shimizu, et al. "*Reconfigurable Adaptive FEC System With Interleaving*", 2005 IEEE, pp. 1252-1255.
Saito, et al. "*500-Mb/s Nonprecharged Data Bus For High-Speed DRAM's*", 1997 IEE, vol. 33, No. 11, pp. 1720-1730.
Numata, et al. "*New Nibbled-Page Architecture For High-Density DRAM's*", 1989 IEEE, vol. 24, No. 4, pp. 900-904.

*Primary Examiner*—Kevin Ellis
*Assistant Examiner*—Mardochee Chery
(74) *Attorney, Agent, or Firm*—Townsend and Townsend and Crew LLP

(57) ABSTRACT

A deinterleaver for performing high-speed multi-channel forward error correction using external SDRAM is provided. According to one exemplary aspect, the deinterleaver performs both read and write accesses to the SDRAM that are burst-oriented by hiding active and precharge cycles in order to achieve high data rate operations. The data bus length of the SDRAM is designed to be twice the deinterleaving symbol size thereby allowing bandwidth to be increased. The deinterleaver accesses data in the SDRAM as read blocks and write blocks. Each block includes a predetermined number of data words to be interleaved/deinterleaved. The ACTIVE command for one block is issued when a preceding block is being processed. Data in one read/write block has the same row address within the same bank of the SDRAM.

58 Claims, 11 Drawing Sheets

METHOD AND SYSTEM FOR PROVIDING A MULTI-CHANNEL INTERLEAVER/DEINTERLEAVER USING SDRAM

BACKGROUND OF THE INVENTION

The present invention generally relates to forward error correction (FEC) and, more specifically, to a method and system for providing high-speed, multi-channel FEC using external SDRAM.

Convolutional interleavers and deinterleavers are commonly employed in an FEC scheme to protect against a burst of errors from being sent to a block decoder, such as a Reed-Solomon decoder. It is well known that interleaving techniques improve error correction capability.

FIG. 1 is a simplified schematic block diagram illustrating a typical convolutional interleaver and deinterleaver. In many applications, interleaved data are buffered using static random access memory (SRAM). The width of data to be stored into the memory matches the interleaver/deinterleaver symbol size. For the interleaver 10, each successive branch (102, 103, . . . , 109) has J more symbols than the immediately preceding branch. For example, branch 103 has J more symbols than branch 102. To the contrary, for the deinterleaver 20, each successive branch (102', 103', 104', . . . , 109') has J fewer symbols than the immediately preceding branch. For example, branch 103' has J fewer symbols than branch 102'. Unless indicated otherwise, "I" represents the interleaving depth and "J" represents the interleaving increment. Thus, one branch has a different delay from another branch. The foregoing characteristic, i.e., the delay difference, thus creates sequential-write addresses and non-sequential-read addresses, or vice versa, when conventional memory access is used. This asymmetry between write and read addresses affects data throughput. Furthermore, another problem associated with SRAM is that SRAM is relatively more expensive than other types of memory, such as, synchronous dynamic random access memory (SDRAM).

In some applications, SDRAM is used to store interleaved data. However, use of SDRAM based on the interleaving/deinterleaving approach described above also has its disadvantages. For example, one disadvantage is that by using conventional SDRAM access, the overhead ACTIVE and PRECHARGE command cycles for non-sequential read or write addresses significantly reduce data throughput. Another disadvantage is that when conventional SDRAM is used, some applications may not have enough bandwidth to satisfy the requirement that the data width associated with the memory needs to be equal to the symbol size.

Hence, it would be desirable to provide a method and system that is able to handle interleaving and deinterleaving in a more efficient manner.

BRIEF SUMMARY OF THE INVENTION

According to an exemplary embodiment of the present invention, a method and system for implementing a deinterleaver for high-speed multi-channel forward error correction using external SDRAM is provided. In an alternative exemplary embodiment, the present invention can be extended for implementation in an interleaver.

According to one exemplary aspect, the deinterleaver performs both read and write accesses to the SDRAM that are burst-oriented by hiding active and precharge cycles in order to achieve high data rate operations.

According to another exemplary aspect, the data bus length of the SDRAM is designed to be twice the deinterleaving symbol size thereby allowing bandwidth to be increased.

According to yet another exemplary aspect, the deinterleaver accesses data in the SDRAM as read blocks and write blocks. Each block includes a predetermined number of data words to be interleaved/deinterleaved. The ACTIVE command for one block is issued when a preceding block is being processed. Data in one read/write block has the same row address within the same bank of the SDRAM.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. In one exemplary embodiment, a multi-channel interleaver/deinterleaver implementation using SDRAM for high-speed multi-channel FEC is provided. Under this exemplary embodiment, a memory, such as an SDRAM, is used as a buffer for interleaved data. A burst length of read/write access to one row in the same bank of the SDRAM is generated in order to hide overhead ACTIVE and PRECHARGE cycles. In addition, the data width of the SDRAM is made to be equal to twice the deinterleaver symbol size thereby doubling the data rates.

Figure 1:
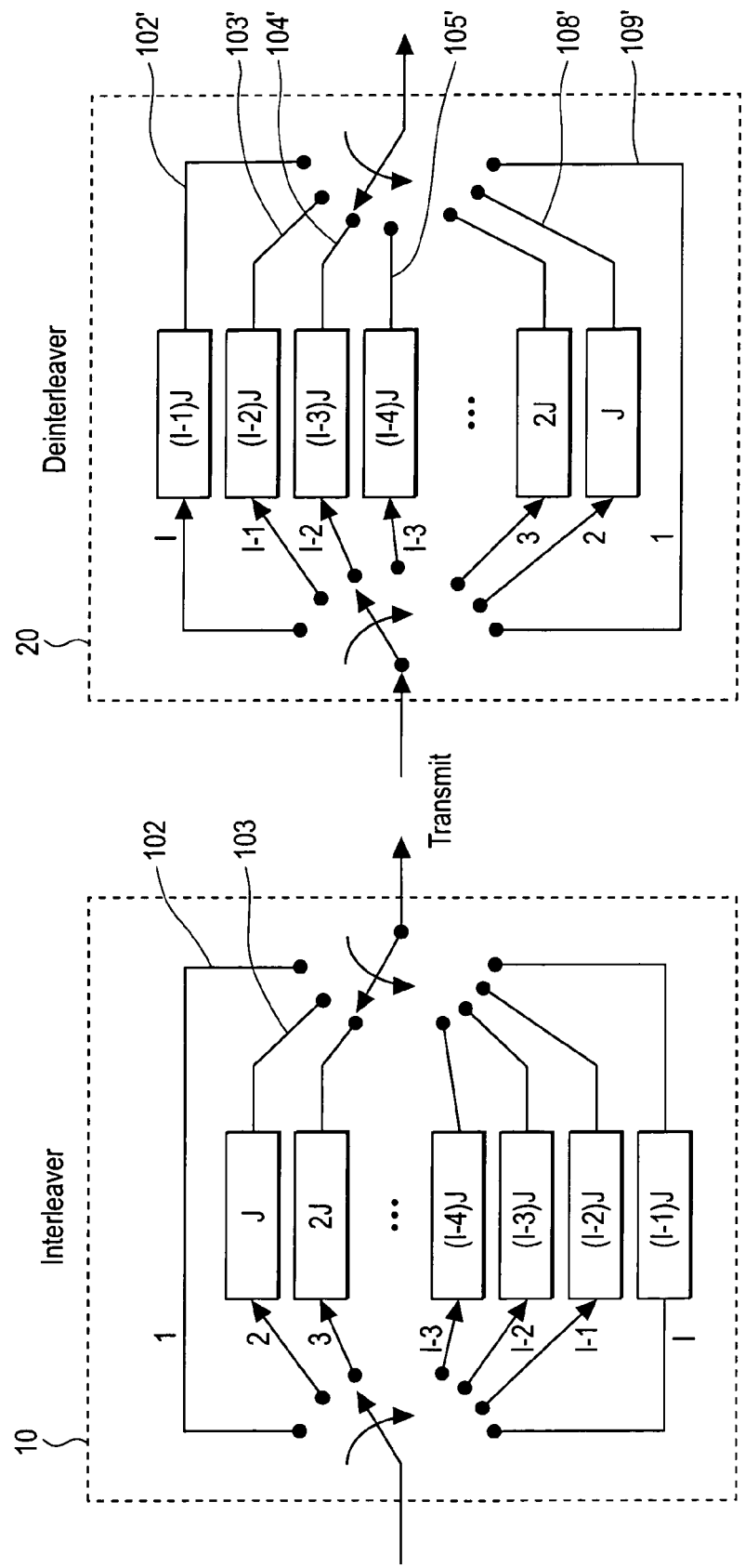
FIG. 1 is a simplified schematic block diagram illustrating a typical convolutional interleaver and deinterleaver.
Figure 2:
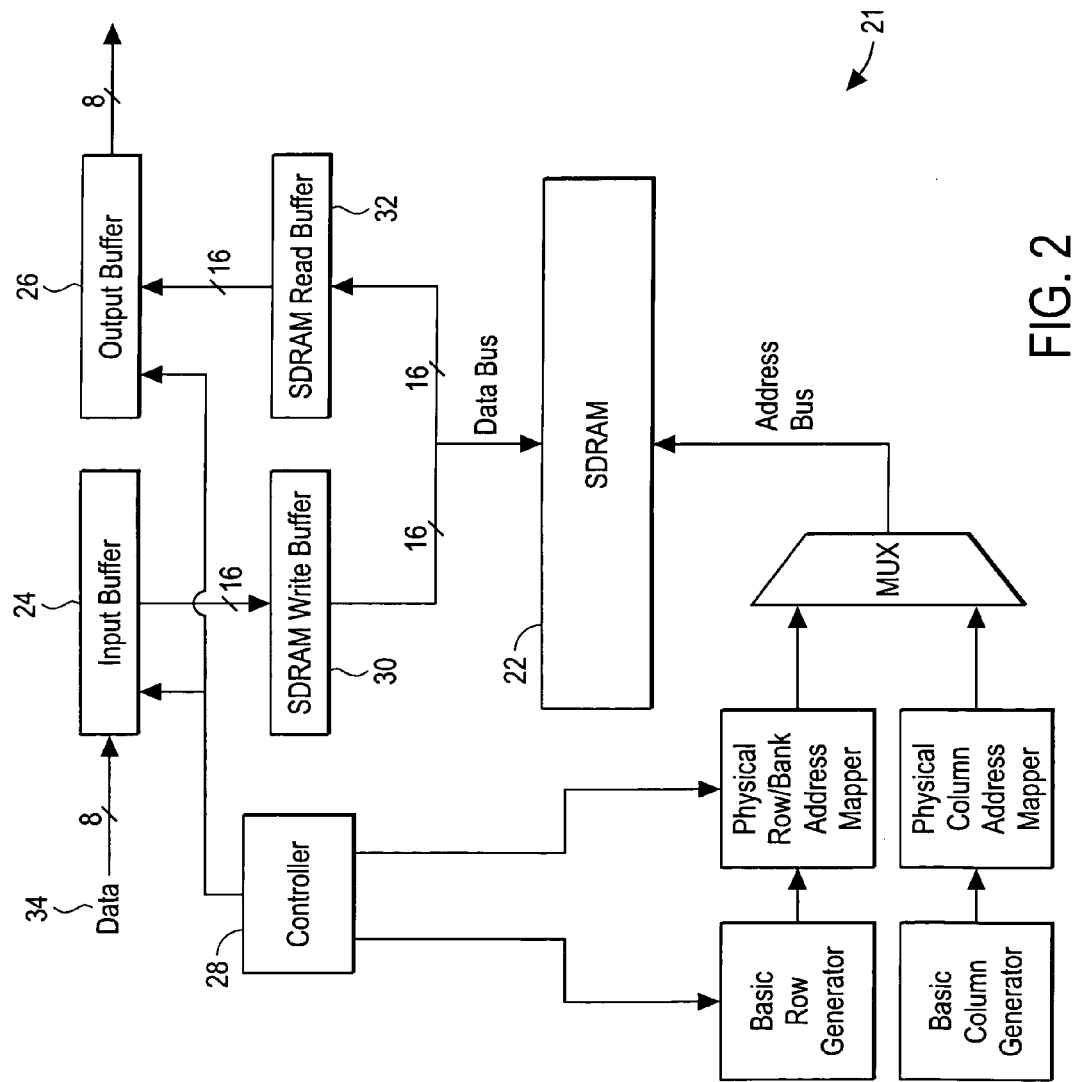
FIG. 2 is a simplified block diagram of a convolutional deinterleaver according to one exemplary embodiment of the present invention.

FIG. 2 illustrates a simplified block diagram of a convolutional deinterleaver 21 according to one exemplary embodiment of the present invention. The convolutional deinterleaver 21 is implemented using an SDRAM 22. In this exemplary embodiment, the data or symbol size is eight (8) bits and the word size is sixteen (16) bits.

As shown in FIG. 2, the input buffer 24 combines two symbols in the same branch of the deinterleaver 21 into a word. The delay between two symbols in the same branch is an integer multiple of the deinterleaving depth I. For each word, the input buffer 24 stores the first symbol until the second symbol of the word is received. When a predetermined number of words for one channel are stored in the input buffer 24, such words, collectively a write block as described further below, are forwarded to the SDRAM write buffer 30 for write processing. According to a preferred embodiment, the size of the input buffer 24 is no more than twice the interleaving depth I. A controller 28 generates a periodic address sequence for the incoming data 34 so that symbols s(t) and s(t+n*I) of one channel are combined to form a word, where n is an integer greater than zero (0). In an exemplary embodiment, n is equal to one (1). Based on the disclosure and teachings provided herein, a person of ordinary skill in the art will know and appreciate how to select the appropriate value for n.

Figure 3:
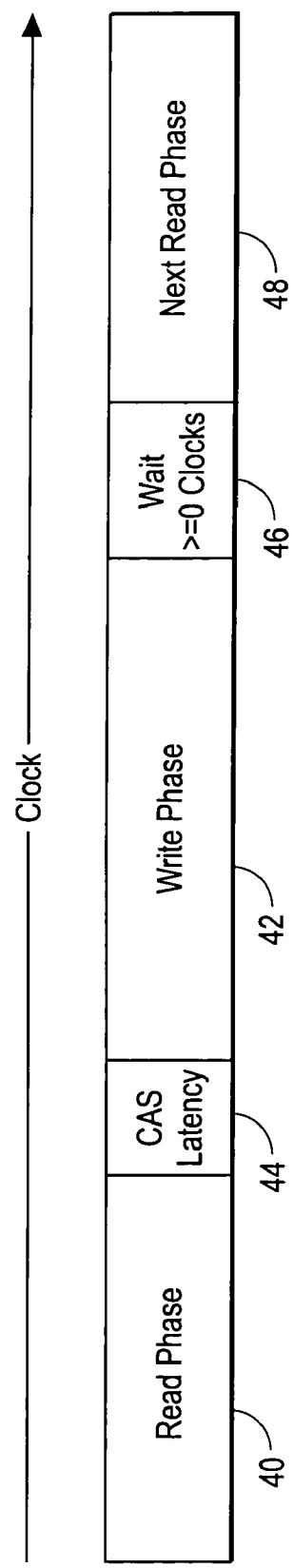
FIG. 3 is a timing diagram illustrating the various phases that occur when the memory of the convolutional deinterleaver is accessed according to one exemplary embodiment of the present invention.

Accessing the SDRAM 22 of the deinterleaver 21 to retrieve data is divided into two phases, namely, a read phase and a write phase. FIG. 3 is a timing diagram illustrating the various phases that occur when the SDRAM 22 is accessed. As shown in FIG. 3, there are the read phase 40 and the write phase 42. In between these two phases 40 and 42, there is a column address strobe (CAS) latency 44. The CAS latency 44 is the delay between a read command and the availability of the output data. In addition, there may also be a wait period 46 between the two phases 40 and 42.

Addressing the SDRAM 22 includes identifying the proper row addresses, column addresses and bank addresses. An ACTIVE command with a row address and a bank address opens a row (identified by the row address) in a particular bank (identified by the bank address) for subsequent data access (i.e., a read or write operation). A PRECHARGE command closes a previously opened row in one bank in order to allow a different row to be subsequently opened in the same bank. A READ (or WRITE) command with a column address and bank address reads (or writes) data in the opened row in the bank. In one exemplary embodiment, the SDRAM 22 with two banks is used. Based on the disclosure and teachings provided herein, a person of ordinary skill in the art will know and appreciate how to access an SDRAM with more than two banks.

According to one exemplary embodiment, the number of total columns used in the SDRAM 22 is an integer multiple M of the interleaving depth I. One column of the SDRAM 22 corresponds to one branch of the interleaver 10 (or deinterleaver 21). One branch of the interleaver 10 (or deinterleaver 21) corresponds to M columns of the SDRAM 22. In an exemplary embodiment, M is equal to one (1) so that the number of columns is equal to the interleaving depth I. Based on the disclosure and teachings provided herein, a person of ordinary skill in the art will know how to choose an SDRAM that has an appropriate number of columns.

During each write phase 42, one or more write blocks are written into the SDRAM 22; alternatively, it is possible that no write blocks are written. Data words in the same block are from the same channel; and data words in different blocks may be from different channels. The number of words to be written into the SDRAM 22 in one write block is an integer multiple of one of the factor(s) of the interleaving depth I. In one exemplary embodiment, each write block that is to be written into the SDRAM 22 has sixteen (16) words. Each write block is further divided into two data groups of equal size. The first data group is written into a first bank of the SDRAM 22 and the second data group is written into a second bank. The respective row addresses in the SDRAM 22 for the two data groups within each write block are the same so that a continuous flow of data can be maintained when data from the same write block are written into the SDRAM 22. Based on the disclosure and teachings provided herein, a person of ordinary skill in the art will know and appreciate how to select the appropriate size of the two data groups and the number of words to be included in each write block.

Figure 4:
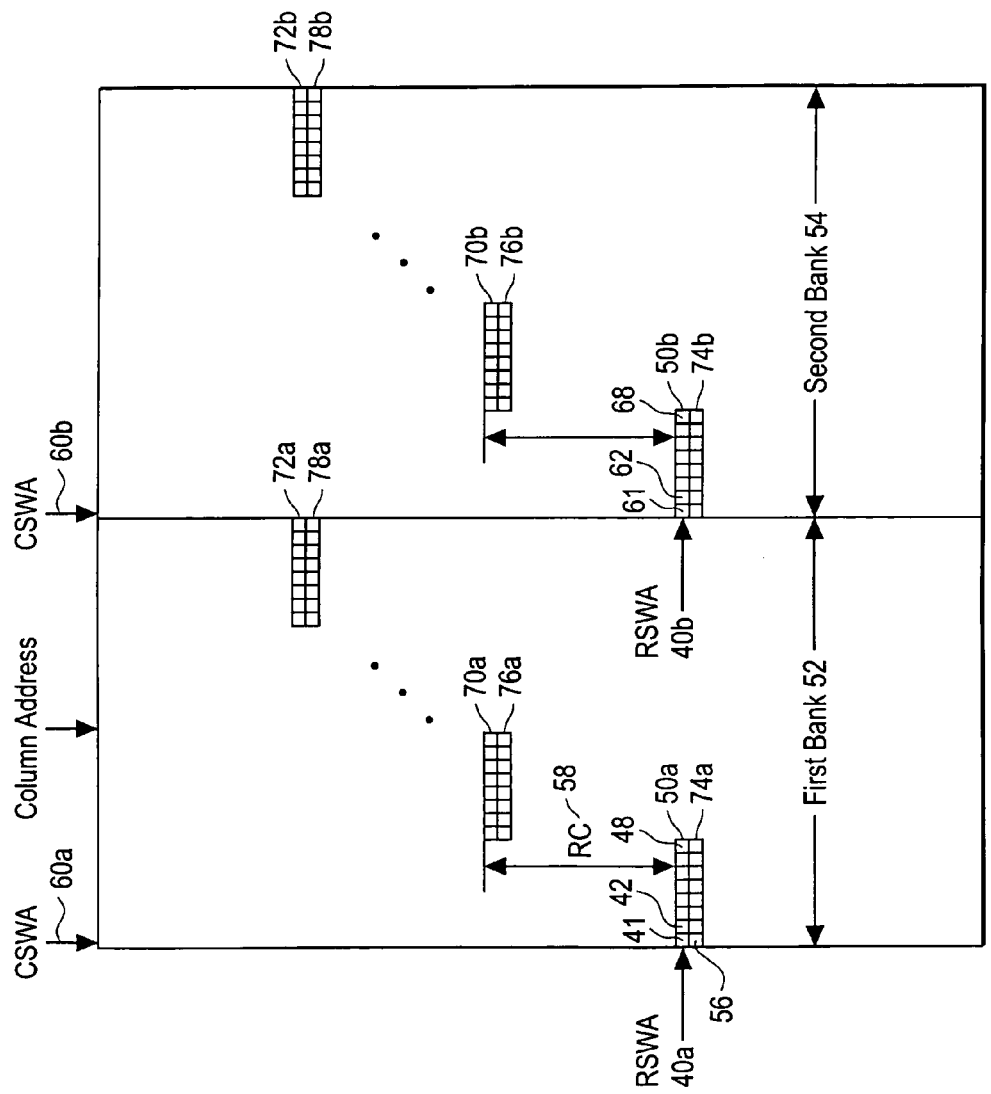
FIG. 4 is a simplified schematic diagram illustrating how data are written into the memory of the convolutional deinterleaver with an interleaving increment being an even number according to one exemplary embodiment of the present invention.

FIG. 4 is a simplified schematic diagram illustrating how data are written into the SDRAM 22 with the interleaving increment J being an even number according to one exemplary embodiment of the present invention. As shown in FIG. 4, data are written to the SDRAM 22 block by block. In this illustration, each write block is divided into two data groups 50a, 50b, each group having a length of eight (8) words. The two data groups 50a, 50b are respectively written into two banks 52, 54. For each write block that is to be written into the SDRAM 22, the first data group 50a has a row address 40 and consecutive column addresses (41, 42, ..., 48) in the first bank 52. The second data group 50b is written with consecutive column addresses (61, 62, ..., 68) in the second bank 54 and may (or may not) have the same row address 40 as the first data group 50a written into the first bank 52.

The generation of the write addresses is divided into two cases: an even number and an odd number interleaving increment J. For the case of an even interleaving increment J, the row and column write addresses are generated as follows. For each channel, the row address is initialized to an appropriate value, namely, a row start write address (RSWA) 40. The RSWA 40 is incremented by one when the last column for that channel is reached, which will be further described below. For each write block, the row address in the first bank 52 for each word of the first data group 50a is the same. The row address of the next write block in the same bank for the same channel is changed by an appropriate value RC 58 such that the first word of the current and next write block can be read using the same row address based on the delay characteristics of the convolutional deinterleaver 21. In this manner, the subsequent words of the current and next write block can also be read using the same respective row addresses.

In an exemplary embodiment, the row address of the next write block for the bank is equal to $r(t+1)=r(t)-B*J$ and wraps around the SDRAM boundary, where $r(t)$ is the row address of the current write block, r(t+1) is the row address of the next write block and B is the number of words to be written in the data group. In an exemplary embodiment, B is equal to eight (8) words. For each channel, the column address begins with an appropriate value, namely, a column start write address (CSWA) 60. In an exemplary embodiment, the CSWA is equal to zero (0). The column address of the SDRAM 22 for the next word within the data group to be written in the same bank for one channel is incremented by one until the last column for that channel is reached. In an exemplary embodiment, the number of columns to be written into the SDRAM 22 is equal to the interleaving depth I. When the last column is reached for one channel, the column address for that channel is reset to the CSWA 60a and the row address is set to the RSWA 40a. Hence, the next write block can be written to the next row 56. Based on the disclosure and teachings provided herein, a person of ordinary skill in the art will know and appreciate how to select the appropriate integer multiple and the number of write blocks.

The generation method of row and column write addresses for the second data group 50b is the same as that used for the first data group 50a as described above, using the same (or different) row start write address (RSWA) and column start write address (CSWA). In one exemplary embodiment, the same RSWA and CSWA are used when writing to the second bank 54, i.e., RSWA 40a and RSWA 40b are the same and, likewise, CSWA 60a and CSWA 60b are the same; in other words, addressing the SDRAM 22 to write both data groups 50a, 50b is the same except with different bank addresses. It should be noted that, in an alternative exemplary embodiment, the RSWAs and the CSWAs for the first and second banks 52, 54 may not be the same.

The write operation as shown in FIG. 4 is further described below. The first write block is divided into the first data group 50a and the second data group 50b, each data group having eight (8) words. The first data group 50a is written into the first bank 52 of the SDRAM 22 using with the RSWA 40a and the CSWA 60a. Words in the first data group 50a are written into the first bank 52 with sequential column addresses. Next, the second data group 50b is written into the second bank 54 of the SDRAM 22 beginning with the RSWA 40b and the CSWA 60b. In this particular case, RSWAs 40a and 40b are the same and CSWAs 60a and 60b are the same. As mentioned above, in other instances, RSWAs 40a and 40b and CSWAs 60a and 60b may not be the same. Similarly, words in the second data group 50b are written into the second bank 54 with sequential column addresses. Essentially, the first data group 50a and the second data group 50b are stored in identical locations in the first and second banks 52, 54 respectively.

The next write block made up of data groups 70a, 70b is then written into the first and second banks 52, 54. More specifically, the starting row address for data group 70a is calculated by offsetting the RC value 58 from the RSWA 40a and the starting column address for data group 70a is the next column address following the last column address used by the last word of the first data group 50a. The same process is repeated with data group 70b in the second bank 54.

The foregoing process is repeated for each write block until the bank boundary is reached. For example, after data groups 72a, 72b have been stored in the first and second banks 52, 54, the next row address to be used is calculated by incrementing the RSWA 40 (instead of offsetting the RC value 58 from the previous row address used by the last written data group). In this instance, the next row address is row address 56. The same process is then repeated resulting in the storing of data groups 74a, 76a and 78a and 74b, 76b and 78b in the first and second banks 52, 54 respectively at locations shown in FIG. 4. It can be seen that upon conclusion of the foregoing process, the data groups are stored in a step-like configuration in both banks 52, 54.

Figure 6:
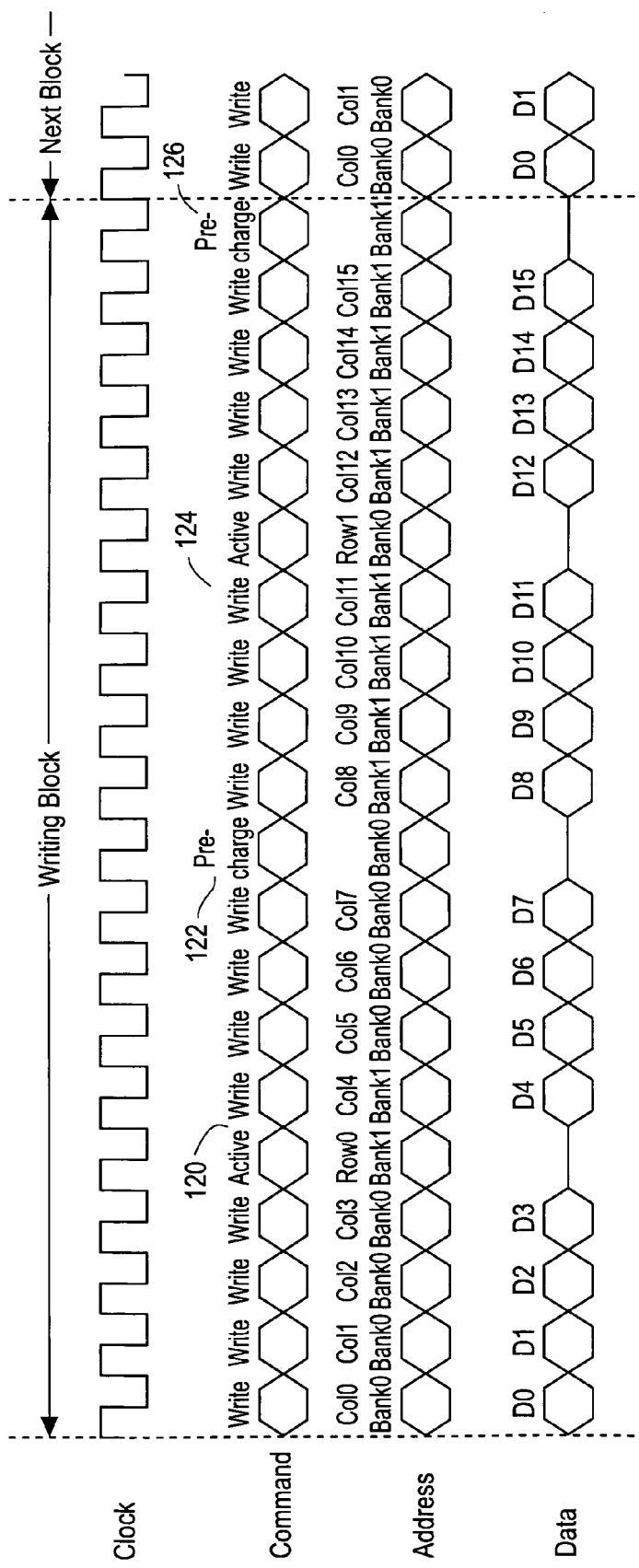
FIG. 6 is a timing diagram illustrating the write phase according to one exemplary embodiment of the present invention.

The write operation for each write block is further illustrated in FIGS. 4 and 6 as follows. After a row in the first bank 52 is activated for the data group 50a by an ACTIVE command, the first data group 50a is written into the first bank 52 of the SDRAM 22 with column addresses (41, 42, . . . 48). While the first data group 50a is being written into the first bank 52, a row in the second bank 54 is activated for the second data group 50b by another ACTIVE command 120. The activation of the second bank 54 during this time is performed such that the elapsed time between execution of the ACTIVE and the WRITE commands is reduced. Once the first data group 50a has been written into the SDRAM 22, the row in the first bank 52 that has previously been activated for the first data group 50a is deactivated by a PRECHARGE command 122. While this deactivation of the row in the first bank 52 is in progress, the second data group 50a is written into the second bank 54 of the SDRAM 22 with column addresses (61, 62, . . . 68). It should be remembered that the writing of the second data group 50b can be performed at this point because the second bank 54 has already been activated. While the second data group 50b is being written into the second bank 54, a row in the first bank 52 is activated by an ACTIVE command 124 for the first data group 70a of the next write block to be written. Once the second data group 50b has been written into the second bank 54, the row in the second bank 54 that has previously been activated for the second data group 50b is deactivated by a PRECHARGE command 126. The foregoing process is then repeated until all the write blocks are written into the SDRAM 22 during the write phase 42, except the last write block of the write phase 42. During writing the second data group in the last write block of the write phase 42, an ACTIVE command 124 is used to activate the first bank of the first read block for the next read phase 48 (if any) so that the read phase 48 can be started immediately after the write phase 42 as shown in FIG. 3.

Figure 7:
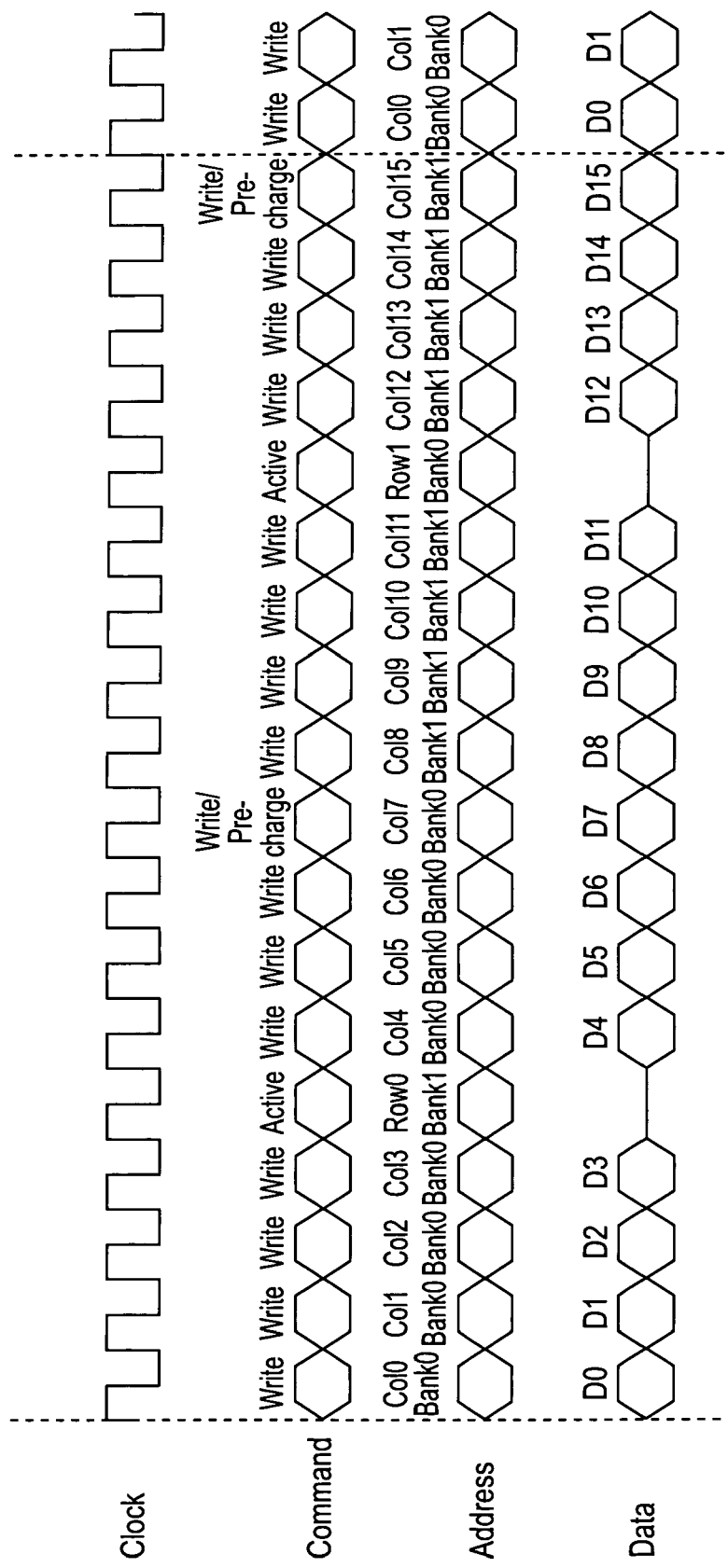
FIG. 7 is a timing diagram illustrating the write phase during which the time cycles of PRECHARGE commands are hidden for higher data throughput according to one exemplary embodiment of the present invention.

FIG. 7 is a timing diagram illustrating the write phase 42 according to another exemplary embodiment of the present invention. AUTO PRECHARGE commands are used to replace the deactivation PRECHARGE commands to totally hide the time of the PRECHARGE commands to further increase data throughput.

For the case of an odd interleaving increment J, each successive branch of the deinterleaver 21 has J fewer symbols than the immediately preceding branch. As a result, the delay difference is an odd value between the two branches. However, the SDRAM 22 stores symbols in words (made up of, for example, two symbols) in one memory address. The delay differences between the column addresses of the SDRAM 22 have to be an even value. As mentioned above, one column of the SDRAM 22 corresponds to one branch of the deinterleaver 21. In an exemplary embodiment, the column addresses are classified into two categories, one for even branches and one for odd branches. The delay differences between the column addresses are an even value within one category and are an odd value within the other category. In one exemplary embodiment, the order of data input to the deinterleaver 21 is classified into two sequences, namely, an even sequence and an odd sequence. The data of the even sequence is input to the branch 102, 104, . . . , 108.

The data of the odd sequence is input to the branch 103, 105, . . . , 109. Each sequence is divided into write blocks. In one exemplary embodiment, each write block that is to be written to the SDRAM 22 has sixteen (16) words. Each write block is further divided into two data groups similar to the case of an even interleaving increment J. The row and column write addresses of the SDRAM 22 are generated as follows.

Figure 5:
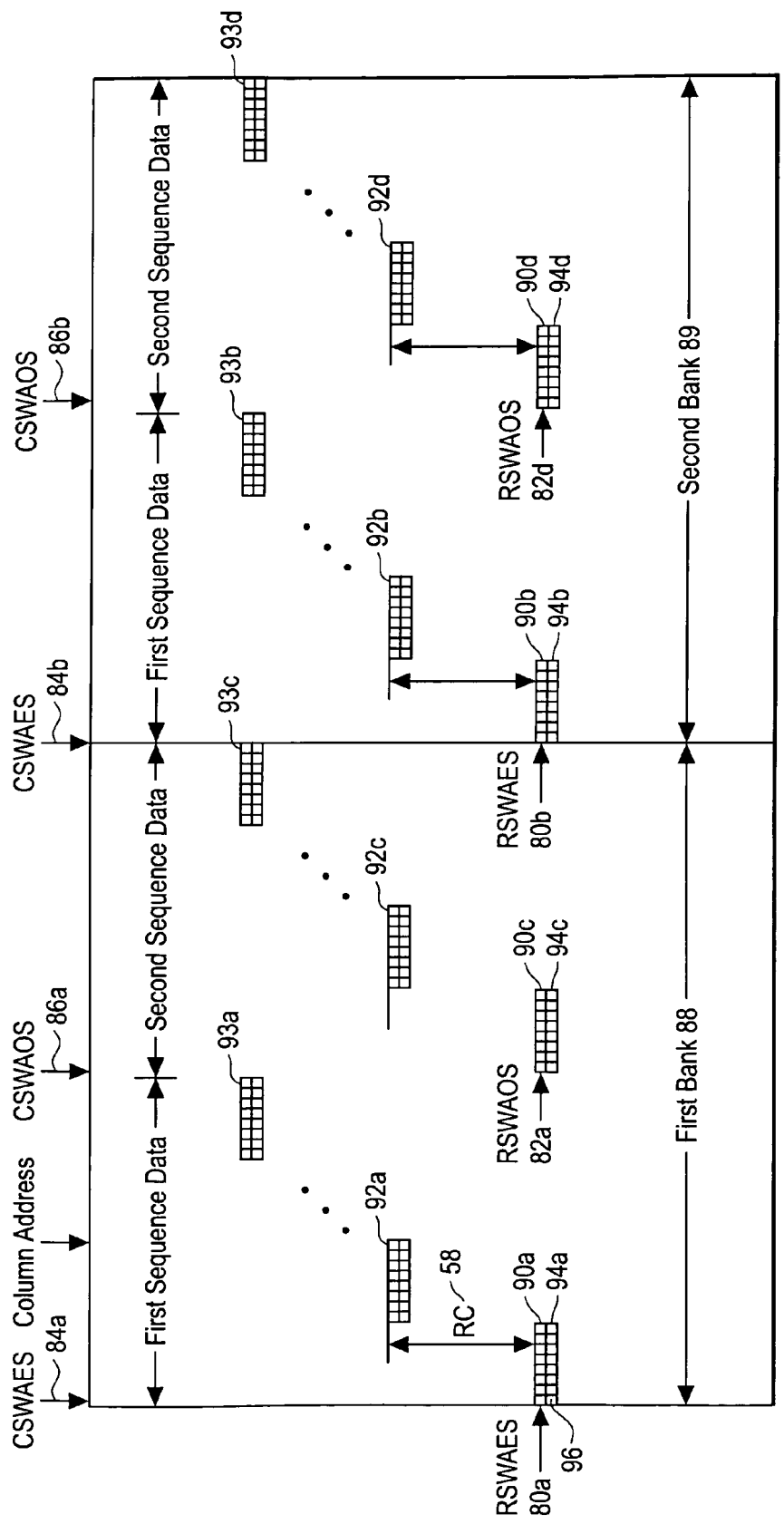
FIG. 5 is a simplified schematic diagram illustrating how data are written into the memory of the convolutional deinterleaver with an interleaving increment being an odd number according to one exemplary embodiment of the present invention.

FIG. 5 is a simplified schematic diagram illustrating how data are written into the SDRAM 22 of the convolutional deinterleaver with the interleaving increment J being an odd number according to one exemplary embodiment of the present invention. Similar to the case of an even interleaving increment J, the row addresses in the first bank 88 of the SDRAM 22 are used to write the first data groups of both sequences. For each channel, the row address for the even sequence is initialized to an appropriate value, namely, row start write address for even sequence (RSWAES) 80a, while the row address for the odd sequence is initialized to an appropriate value, namely, row start write address for odd sequence (RSWAOS) 82a, such that the even and odd sequences can be read using the same row address, thereby providing a continuous flow of reading data. In an exemplary embodiment, the RSWAOS 82a is equal to the RSWAES 80a but the first I*J/2 data in the odd sequence are discarded due to delay latency. For each channel, the column address for the even sequence is initialized to an appropriate value, namely, column start write address for even sequence (CSWAES) 84a. In an exemplary embodiment, the CSWAES 84a is equal to zero (0). The column address for the odd sequence is initialized to an appropriate value, namely, column start write address for odd sequence (CSWAOS) 86a, so that data in the odd sequence are not overlapped to the data in the even sequence in the SDRAM 22. Note that each column of the SDRAM 22 corresponds to one branch of the deinterleaver 21. The number of columns for each sequence is an integer multiple M of the interleaving depth I/2 due to half of the branches of the deinterleaver 21 for each sequence. In an exemplary embodiment, M is equal to one (1), the CSWAOS 86a is equal to CSWAES+I/2 and wraps around the SDRAM boundary. The way to generate the row and column write addresses of SDRAM for both sequences is the same as that in the even interleaving increment J case, except that the number of columns for each sequence to be written into the SDRAM 22 is half the number of columns in the even interleaving increment J case.

The write operation as shown in FIG. 5 is further described below. The first write block of the first (even) sequence is divided into data group 90a and data group 90b, each data group having eight (8) words. Similarly, the first write block of the second (odd) sequence is divided into data group 90c and data group 90d. Data group 90a is written into the first bank 88 of the SDRAM 22 using with the RSWAES 80a and the CSWAES 84a. Words in data group 90a are written into the first bank 88 with sequential column addresses. Next, data group 90b is written into the second bank 89 of the SDRAM 22 beginning with the RSWAES 80b and the CSWAES 84b. In this particular case, RSWAESs 80a and 80b are the same and CSWAESs 84a and 84b are the same. As mentioned above, in other instances, RSWAESs 80a and 80b and CSWAESs 84a and 84b may not be the same. Similarly, words in data group 90b are written into the second bank 89 with sequential column addresses. Essentially, data groups 90a and 90b of the first sequence are stored in identical locations in the first and second banks 88, 89 respectively.

The next write block from the second sequence made up of data groups 90c, 90d is then written into the first and second banks 88, 89. Data group 90c is written into the first bank 88 of the SDRAM 22 using with the RSWAOS 82a and the CSWAOS 86a. Words in data group 90c are written into the first bank 88 with sequential column addresses. Next, data group 90d is written into the second bank 89 of the SDRAM 22 beginning with the RSWAOS 82b and the CSWAOS 86b. Again, in this particular case, RSWAOSs 82a and 82b are the same and CSWAOSs 86a and 86b are the same. Similarly, words in data group 90d are written into the second bank 89 with sequential column addresses. Essentially, data groups 90c and 90d of the second sequence are also stored in identical locations in the first and second banks 88, 89 respectively.

The next write block from the first sequence made up of data groups 92a, 92b is then written into the first and second banks 88, 89. More specifically, the starting row address for data group 92c is calculated by offsetting the RC value 58 from the RSWAES 80a and the starting column address for data group 92a is the next column address following the last column address used by the last word of data group 90a. The same process is repeated with data group 92b in the second bank 89. After data groups 92a, 92b are written, the same process is repeated for the next write block from the second sequence made up of data groups 92c, 92d.

The foregoing process is repeated alternately for write blocks from the first and second sequences until the CSWAOSs and bank boundaries are reached. For example, after data groups 93c, 93d from the second sequence have been stored in the first and second banks 88, 89, the next row address to be used for the next write block from the first sequence is calculated by incrementing the RSWAES 80a (instead of offsetting the RC value 58 from the previous row address used by the last written data group from the first sequence). In this instance, the next row address is row address 96. The same process is then repeated resulting in the storing of data groups 94a, 94c and 94b, 94d in the first and second banks 88, 89 respectively at locations shown in FIG. 5. It can be seen that upon conclusion of the foregoing process, the data groups are stored in two step-like configurations in both banks 88, 89.

During the read phase 40, a predetermined number of words are read from the SDRAM 22 for one channel. The predetermined number is an integer multiple of the length of a processing block for one channel for the component following the deinterleaver 21. In an exemplary embodiment, where the component following the deinterleaver 21 is a Reed-Solomon (RS) decoder, the number of words to be read in each read phase 40 is an integer multiple of the length of an RS codeword. Each read phase 40 retrieves a number of read blocks from the SDRAM 22 with each read block being made up of a number of words. The number of read blocks to be retrieved in each read phase 40 is an integer multiple of B, the number of words in the data group described above. In an exemplary embodiment, B is eight (8). There is a delay, namely, start-up latency, for each channel between the first write block and the first read block. In one exemplary implementation, the start-up latency is equal to the deinterleaver delay latency plus the predetermined number of words. A person of ordinary skill in the art will know and appreciate how to decide the start-up latency, the number of words to be read and the number of read blocks in one read phase 40.

Each read block includes the predetermined number of words to be read. To fill each read block, data with the same row address in the first bank are retrieved first and data with the same row address in the second bank are then retrieved.

Figure 8:
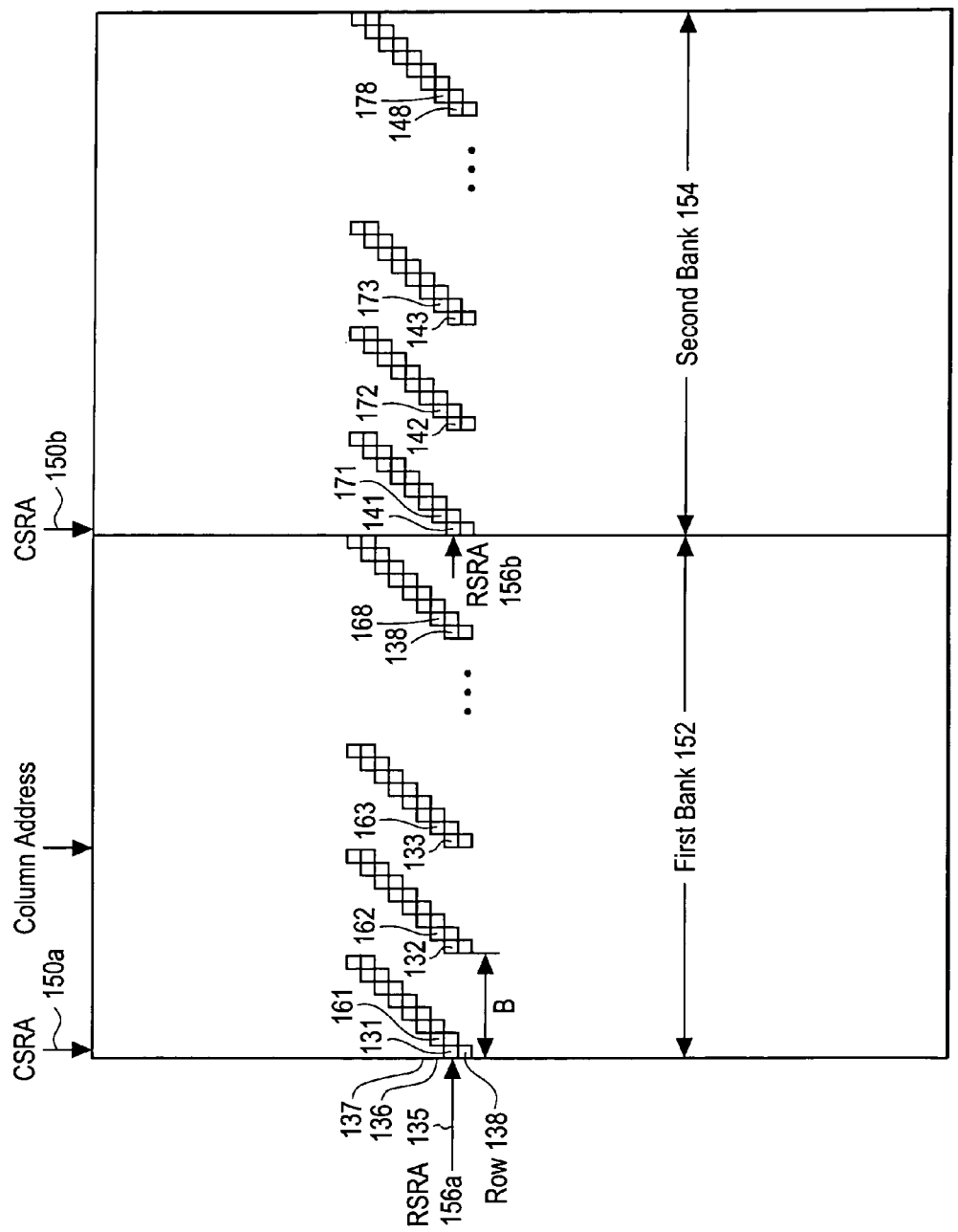
FIG. 8 is a simplified schematic diagram illustrating how data are read from the SDRAM of the convolutional deinterleaver with an interleaving increment being an even number according to one exemplary embodiment of the present invention.

FIG. 8 is a simplified schematic diagram illustrating how data are read from the SDRAM 22 of the convolutional deinterleaver 21 with the interleaving increment J being an even number according to one exemplary embodiment of the present invention. For the case of the interleaving increment J being an even number, the read addresses of the SDRAM 22 are generated as follows.

For the first bank 152 of the SDRAM 22, there is a row start address, namely, row start read address (RSRA) 156a. RSRA 156a is initialized to be equal to the row start write address (RSWA) 40a described above. For each read phase 40, the row address is initialized to the RSRA 156a. The row addresses for all words within a read block are the same for the same bank. After a read block is retrieved, the row address is decremented by one (1) and wrapped around the SDRAM boundary so that rows 135, 136, 137 . . . can be retrieved. There is a column start address, namely, column start read address (CSRA) 150a. For each read phase 40, CSRA 150a is initialized to the column start write address (CSWA) 60a described above. CSRA 150a is then incremented by one (1) for the next read block. Within each read block, the column address begins from CSRA 150a and is incremented by B so that the column addresses for words within one block are column addresses 131, 132, 133, . . . , 138. After all the words making up B read blocks for one channel have been read from the SDRAM 22, RSRA 156a is incremented by one (1) and wrapped around the SDRAM boundary. CSRA 150a is reset to CSWA 60a. At the same time, the row address is incremented to the next row 138 and the column address is reset to CSRA 150a.

The row and column addresses for the second bank 154 are generated the same way as those for the first bank 152, except the row start read address (RSRA) 156b and column start read address (CSRA) 150b are used for the second bank 154. In one exemplary embodiment, where both data groups have the same RSRAs and CSRAs, addressing the SDRAM 22 for both data groups is the same except with a different bank address. As a result, the column addresses of one block are columns 141, 142, 143 . . . 148 as illustrated in FIG. 8.

The read operation as shown in FIG. 8 is further described below. The read operation is performed to retrieve data or blocks that were stored previously based on the write operation shown in FIG. 4 above. In other words, in the read operation, data groups are read out from two banks 152, 154 of the SDRAM 22 with two data groups forming a read block. In this illustration, the interleaving increment J is an even number.

The read operation is performed as follows. The read operation is initially performed on the first bank 152 using RSRA 156a and CSRA 150a. RSRA 156a and CSRA 150a correspond to RSWA 40a and CSWA 60a respectively. Word stored at the address represented by RSRA 156a and CSRA 150a is retrieved. This word is the first word in the data group. The column address for the second word is then calculated by offsetting the value B from the previous column address which in this instance is CSRA 150a. As mentioned above, B is the number of words in the data group. This results in the column address 132. Note that the row addresses of all words in a data group in the first bank 152 are the same. The second word stored at the address represented by RSRA 156a and column address 132 is retrieved. The foregoing process is repeated until all the words in the data group are retrieved. In this case, eight (8) words located at RSRA 156a and column addresses 131, 132, 133, . . . , 138 are retrieved. These eight (8) words represent the first data group in the read block.

The foregoing process is then performed on the second bank 154 using RSRA 156b and CSRA 150b initially. In this instance, RSRA 156b and CSRA 150b are the same as RSRA 156a and CSRA 150a respectively. However, in other instances, RSRA 156b and CSRA 150b may not be the same as RSRA 156a and CSRA 150a depending on how the data were written into the SDRAM 22. Upon conclusion, eight (8) words located at RSRA 156b and column addresses 141, 142, 143, . . . , 148 are retrieved. These eight (8) words represent the second data group in the read block. Together, the previously retrieved first data group and this second data group make up one read block.

The next read block is then retrieved from the banks 152, 154. The first word of the next read block is located in the first bank 152. The initial address of this first word is calculated as follows. The initial row address is obtained by decrementing the row address of the previously retrieved read block in the first bank 152. In this instance, the new row address is row address 136. The initial column address is obtained by incrementing the column address of the previously retrieved read block in the first bank 152. In this instance, the new column address is column address 161. The first word of the next read block is located at row address 136 and column address 161 in the first bank 152. Similarly, as described above, the words making up the first data group of the next read block are retrieved. In this instance, these words are located at row 136 and column addresses 161, 162, 163, . . . , 168.

The same process is then performed on the second bank 154 to retrieve the second data group of the next read block. In this instance, these words are located at row 136 and column addresses 171, 172, 173, . . . , 178. Together, the previously retrieved first data group and this second data group make up the next read block.

The foregoing process is repeated to retrieve all the read blocks until the bank boundary is reached. When the bank boundary is reached, the initial address of the next read block to be retrieved is obtained as follows. The new row address is obtained by incrementing RSRA 156a. In this instance, the new row address is row address 138. The new column address is obtained by resetting to CSRA 150a. The process is then repeated to retrieve all the read blocks until the bank boundary is reached again in which case the initial address of the next read block to be retrieved is obtained as described above. Alternatively, the process terminates when all the read blocks for a particular channel have been retrieved.

Viewed from a more general perspective, the foregoing process retrieves data groups (each data group being made up of a number of words) from the first and second banks 152, 154 in an alternating manner.

Figure 10:
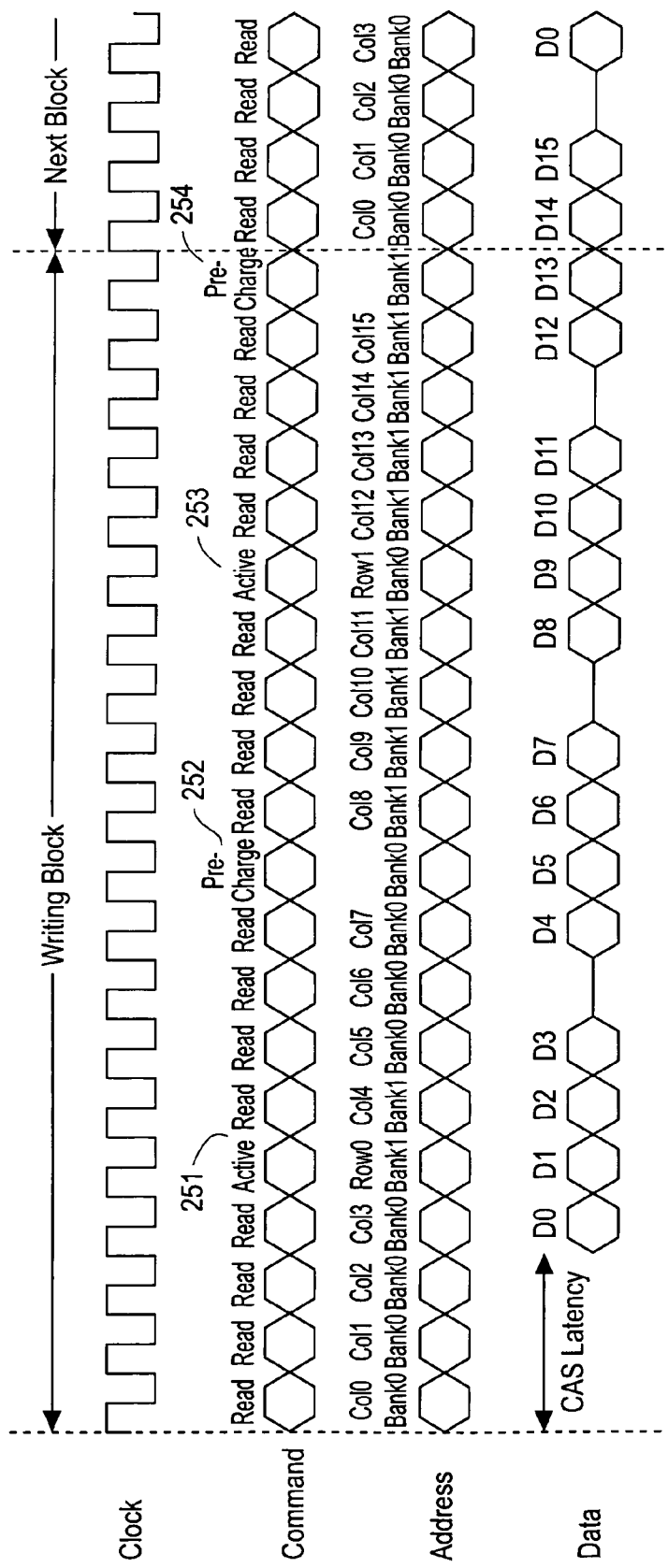
FIG. 10 is a timing diagram illustrating the read phase according to one exemplary embodiment of the present invention.

The read operation for each read block is further illustrated in FIGS. 8 and 10 as follows. After a row in the first bank 152 is activated for the first group by an ACTIVE command, the data of the first data group are read from the first bank 152 of the SDRAM 22 with column address 131, 132, 133, . . . , 138. While the first data group is being read from the first bank 152, a row in the second bank 154 is activated for the second data group by another ACTIVE command 251. The activation of the second bank 154 during this time is performed such that the elapsed time interval between execution of the ACTIVE and the READ commands is reduced. Once the data of the first data group have been read from the SDRAM 22, the row in the first bank 152 that has previously been activated for the first data group is deactivated by a PRECHARGE command 252. While this deactivation of the row in the first bank 152 is in progress, data of the second data group are read from the second bank 154 of the SDRAM 22 with column addresses 141, 142, 143, . . . , 148. It should be remembered that the reading of the second data group can be performed at this point because the second bank 154 has already been activated. While the second data group is being read from the second bank 154, a row in the first bank 152 is activated by an ACTIVE command 253 for the first data group for the next read block to be read. Once the data of the second data group have been read from the second bank 154, the row in the second bank 154 that has previously been activated for the second data group is deactivated by a PRECHARGE command 254. The foregoing process is then repeated until all the read blocks are read from the SDRAM 22 during the read phase 40, except the last read block of the read phase 40. During reading of the second data group in the last read block of the read phase 40, an ACTIVE command 253 is used to activate the first bank of the first write block for the next write phase 42 (if any) so that the write phase 42 can be started immediately after CAS 44 as shown in FIG. 3.

It should be remembered that there is a column address strobe (CAS) delay between the read phase and the next write phase as shown in FIG. 3. During the CAS period, the last few words of the last read block are available to the deinterleaver 21.

Figure 11:
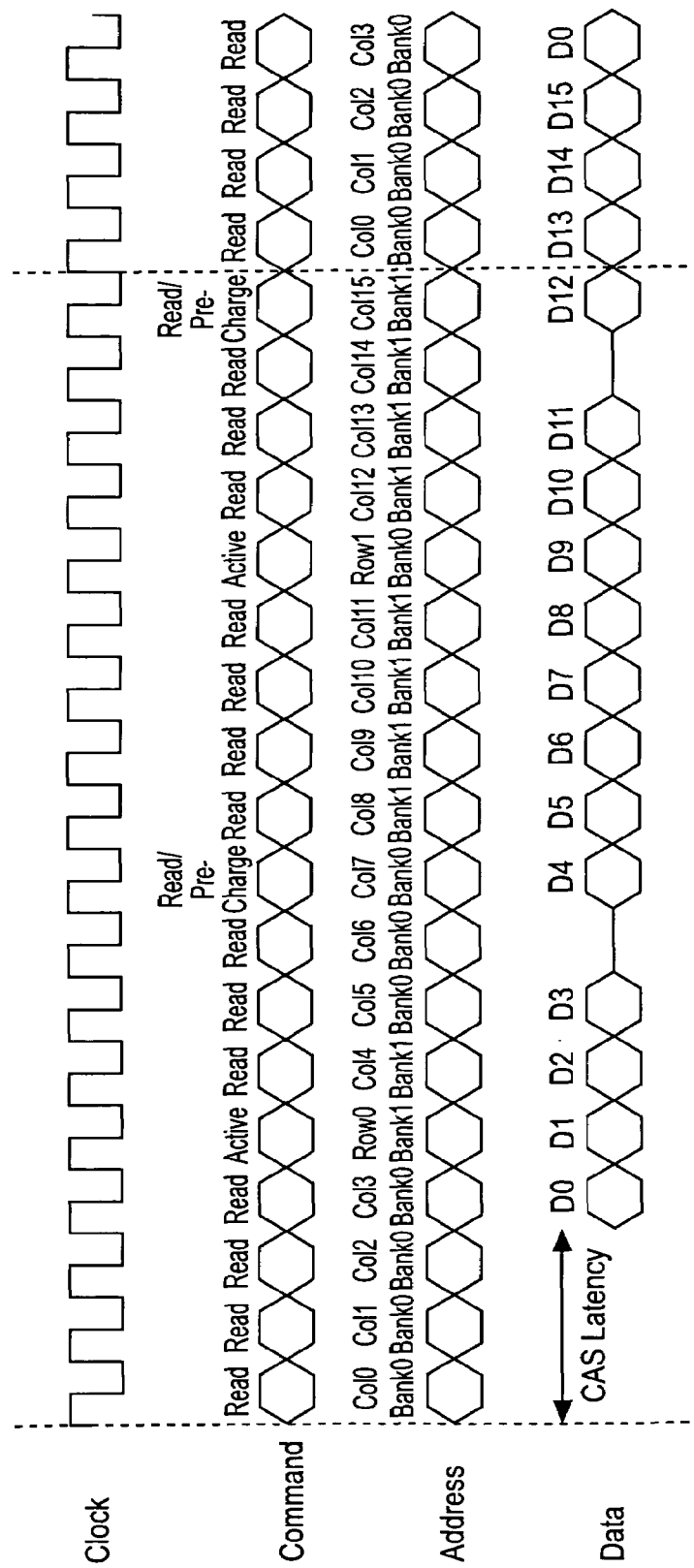
FIG. 11 is a timing diagram illustrating the read phase during which the time cycles of PRECHARGE commands are hidden for higher data throughput according to one exemplary embodiment of the present invention.

FIG. 11 is a timing diagram illustrating the read phase according to another exemplary embodiment of the present invention. AUTO PRECHARGE commands are used to replace the deactivation PRECHARGE commands to totally hide the time of the PRECHARGE commands to further increase data throughput.

Figure 9:
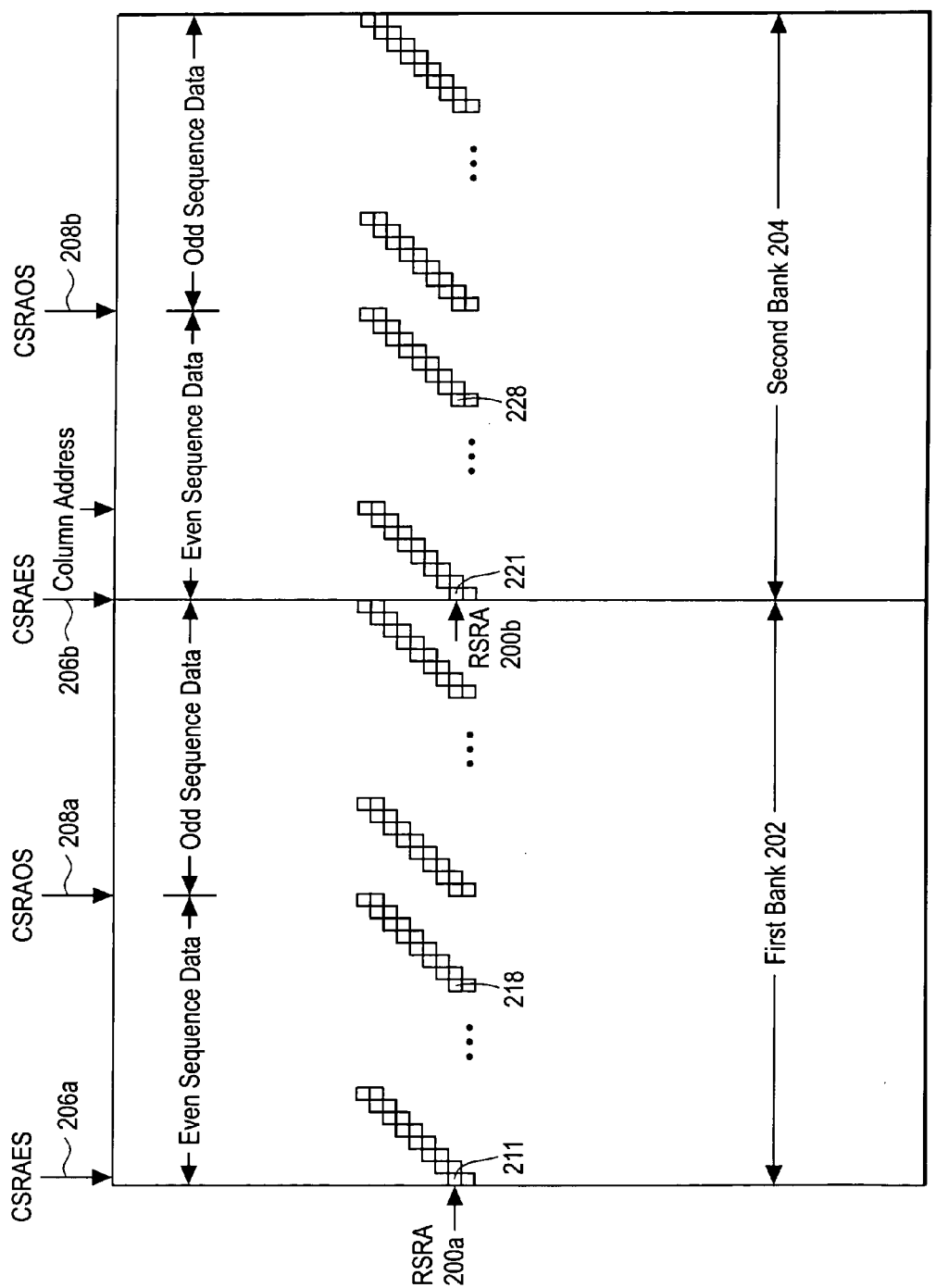
FIG. 9 is a simplified schematic diagram illustrating how data are read from the SDRAM of the convolutional deinterleaver with an interleaving increment being an odd number according to one exemplary embodiment of the present invention.

FIG. 9 is a simplified schematic diagram illustrating how data are read from the SDRAM 22 of the convolutional deinterleaver 21 with the interleaving increment J being an odd number according to one exemplary embodiment of the present invention. For the case of the interleaving increment J being an odd number, the row read addresses for both the even and odd sequences for one read block are the same. Each read block can be filled with words of both sequences with a continuous flow of reading data. Hence, the read addresses of the SDRAM 22 are generated the same way as those in the case where the interleaving increment J is an even number, except that the column start read address uses CSRAES 206a and CSRAOS 208a. In one exemplary embodiment, the CSRAOS is equal to CSRAES+I/2 and wraps around the SDRAM boundary, the generation of the row and column read addresses is the same as that in the case where the interleaving increment J is an even number. The difference between the even and odd values of the interleaving increment J is the order of the read data sequence. The retrieved data is reordered to the correct branch order of the deinterleaver 21 in the output buffer 26 described further below.

The read operation as shown in FIG. 9 is further described below. The read operation is performed to retrieve data or blocks that were stored previously based on the write operation shown in FIG. 5 above. In this illustration, the interleaving increment J is an odd number. The read operation is initially performed on the first bank 202 using RSRA 200a and CSRAES 206a to retrieve the first data group of the first read block. In this instance, RSRA 200a and CSRAES 206a are the same as RSWAES 80a and CSWAES 84a respectively. Word stored at the address represented by RSRA 200a and CSRAES 206a is retrieved. This word is the first word in the first data group of the first sequence. The column address for the second word is then calculated by offsetting the value B from the previous column address which in this instance is CSRAES 206a. As mentioned above, B is the number of words in the data group. The foregoing process is repeated until all the words in the first data group of the first sequence are retrieved from the first bank 202. In this case, eight (8) words located at RSRA 200a and column addresses 211, . . . , 218 are retrieved. These eight (8) words represent the first data group in the first bank 202.

The foregoing process is then performed on the second bank 204 using RSRA 200b and CSRAES 206b initially. In this instance, RSRA 200b and CSRAES 206b are the same as RSWAES 80b and CSWAES 84b respectively. Similarly, upon conclusion, eight (8) words located at RSRA 200b and column addresses 221, . . . , 228 are retrieved. These eight (8) words represent the second data group in the second bank 204. Together, the previously retrieved first data group and this second data group make up one read block for the first (even) sequence. The same process is then performed to retrieve two data groups making up one read block for the second (odd) sequence.

Data groups forming the next read block from the first sequence are then retrieved from the banks 202, 204. The initial address for the first data group is obtained as follows. For bank 202, the initial row address is obtained by decrementing the row address that was used to retrieve the previous data group in the first sequence; the initial column address is obtained by incrementing the column address that was used to retrieve the previous data group in the first sequence. This first data group is then retrieved as described above. Similarly, the second data group is retrieved from bank 204. The first and second data groups then make up the next read block from the first sequence. Likewise, data groups forming the next read block from the second sequence are also retrieved.

Viewed from a more general perspective, the foregoing process retrieves read blocks from the first and second sequences in an alternating manner. More specifically, data groups making up a read block for the first sequence are retrieved from the banks 202, 204. Subsequently, data groups making up a read block for the second sequence are then retrieved from the banks 202, 204. This alternating retrieval of read blocks is performed until all the desired read blocks from a channel are retrieved.

Similar to the case where the interleaving increment J is an even number, in the present situation where the interleaving increment J is an odd number, when a sequence boundary is reached, RSRA 200a is incremented to obtain the next row address and the next column address is reset to CSRAES 206a.

As shown in FIG. 2, the SDRAM read buffer 32 stores read data during a read phase. The stored data in the SDRAM read buffer 32 are forwarded to an output buffer 26 after the read phase. The output buffer 26 reorders the data and converts words into symbols. It should be remembered that the read operation addressing the columns of the SDRAM 22 in the read phase is different from the write operation addressing the columns in the write phase(s) for one channel. In an exemplary embodiment, the data for one channel are written into the SDRAM 22 with the column addresses in the order of 41, 42, . . . 48, and then 61, 62, . . . , 68 as shown in FIG. 4. However, the data are read from the SDRAM 22 with the column addresses in order of 131, 132, 133, . . . , 138 and then 141, 142, 143, . . . , 148 as shown in FIG. 8. The read data should be permuted so that the order of the data is the same as that of the write data during the write operation which, in turn, is equal to the branch sequence of the deinterleaver 22. The words are then recovered to two symbols, namely s(t) and s(t+n*I), for one channel, where n is the integer used in the input buffer 24 described above. Contents from the output buffer are then delivered to other parts of the system. Based on the disclosure and teachings provided herein, a person of ordinary skill in the art will know and appreciate how to perform permutation and recovery of read data.

An exemplary embodiment of the present invention as described herein is illustrated in the context of an SDRAM having two banks. However, based on the disclosure and teachings provided herein, it will be appreciated by a person of ordinary skill in the art that the present invention can be applied to an SDRAM or other memory having more than two banks. For example, in an alternative exemplary embodiment, the present invention can be applied to multiple pairs of banks in an SDRAM, each pair of banks being used to store interleaved data for a corresponding channel.

It should be understood that the present invention as described above can be realized in the form of control logic, implemented in software or hardware or a combination of both, in either an integrated or distributed manner. A person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for handling interleaved data in connection with a device having a memory, wherein the device is associated with an interleaving increment and an interleaving depth and wherein the memory has a first bank and a second bank, the method comprising:
   receiving a plurality of symbols;
   forming a plurality of words, each word being made up of a pair of symbols;
   identifying a plurality of write blocks, wherein each write block is made up of a first data group and a second data group and the first and second data groups each has a predetermined number of words; and
   when the interleaving increment is an even number, storing the plurality of write blocks in the memory in the following manner:
      maintaining a first row start write address (RSWA) and a first column start write address (CSWA) for the first bank;
      maintaining a second RSWA and a second CSWA for the second bank;
      retrieving a first write block;
      writing the first data group of the first write block into the first bank using the first RSWA and the first CSWA, wherein words in the first data group have the same first RSWA and respective column addresses for words in the first data group are obtained by incrementing the first CSWA;
      writing the second data group of the first write block into the second bank using the second RSWA and the second CSWA, wherein words in the second data group have the same second RSWA and respective column addresses for words in the second data group are obtained by sequentially incrementing the second CSWA;
      retrieving a second write block;
      determining a starting row address in the first bank for the first data group of the second write block based on an offset from the first RSWA;
      determining a starting column address in the first bank for the first data group of the second write block based on the column address of the last word in the first data group of the first write block;
      writing the first data group of the second write block into the first bank using the determined starting row and column addresses in the first bank, wherein words in the first data group of the second write block have the same determined starting row address in the first bank and respective column addresses for words in the first data group of the second write block are obtained by sequentially incrementing the determined starting column address in the first bank;
      determining a starting row address in the second bank for the second data group of the second write block based on the offset from the second RSWA;
      determining a starting column address in the second bank for the second data group of the second write block based on the column address of the last word in the second data group of the first write block; and
      writing the second data group of the second write block into the second bank using the determined starting row and column addresses in the second bank, wherein words in the second data group of the second write block have the same determined starting row address in the second bank and respective column addresses for words in the second data group of the second write block are obtained by sequentially incrementing the determined starting column address in the second bank.

2. The method of claim 1 further comprising:
   upon reaching a bank boundary in the first bank, for a next write block to be written into the memory, determining a starting row address in the first bank for the first data group of the next write block by incrementing the first RSWA, and resetting a starting column address in the first bank for the first data group of the next write block to the first CSWA; and
   upon reaching a bank boundary in the second bank, for the next write block to be written into the memory, determining a starting row address in the second bank for the second data group of the next write block by incrementing the second RSWA, and resetting a starting column address in the second bank for the second data group of the next write block to the second CSWA.

3. The method of claim 1, wherein the memory is a synchronous dynamic random access memory, and further comprising:
   while the first data group of the first write block is being written into the first bank, issuing a first ACTIVE command to activate a row identified by the second RSWA in the second bank; and
   while the second data group of the first write block is being written into the second bank, issuing a second ACTIVE command to activate a row identified by the determined starting row address in the first bank for the first data group of the second write block.

4. The method of claim 1, wherein the memory is a synchronous dynamic random access memory, and further comprising:
while the second data group of the second write block is being written into the second bank, issuing an ACTIVE command to activate a row in the first bank in preparation for a read block to be read from the first bank.

5. The method of claim 1, wherein the memory is a synchronous dynamic random access memory, and further comprising:
after the first data group of the first write block has been written into the first bank, issuing a PRECHARGE command to deactivate a row that is used to store the first data group of the first write block.

6. The method of claim 1, wherein the memory is a synchronous dynamic random access memory, and further comprising:
after the first data group of the first write block has been written into the first bank, issuing an AUTO PRECHARGE command to deactivate a row that is used to store the first data group of the first write block.

7. The method of claim 1 further comprising:
when the interleaving increment is an odd number, storing the plurality of write blocks in the following manner:
dividing the plurality of write blocks into an even sequence and an odd second sequence;
maintaining a first row start write address for even sequence (RSWAES), a first row start write address for odd sequence (RSWAOS), a first column start write address for even sequence (CSWAES) and a first column start write address for odd sequence (CSWAOS) for the first bank;
maintaining a second RSWAES, a second RSWAOS, a second CSWAES and a second CSWAOS for the second bank;
retrieving a first write block from the even sequence;
writing the first data group of the first write block from the even sequence into the first bank using the first RSWAES and the first CSWAES, wherein words in the first data group of the first write block from the even sequence have the same first RSWAES and respective column addresses for words in the first data group of the first write block from the even sequence are obtained by incrementing the first CSWAES;
writing the second data group of the first write block from the even sequence into the second bank using the second RSWAES and the second CSWAES, wherein words in the second data group of the first write block from the even sequence have the same second RSWAES and respective column addresses for words in the second data group of the first write block from the even sequence are obtained by incrementing the second CSWAES;
retrieving a first write block from the odd sequence;
writing the first data group of the first write block from the odd sequence into the first bank using the first RSWAOS and the first CSWAOS, wherein words in the first data group of the first write block from the odd sequence have the same first RSWAOS and respective column addresses for words in the first data group of the first write block from the odd sequence are obtained by incrementing the first CSWAOS;
writing the second data group of the first write block from the odd sequence into the second bank using the second RSWAOS and the second CSWAOS, wherein words in the second data group of the first write block from the odd sequence have the same second RSWAOS and respective column addresses for words in the second data group of the first write block from the odd sequence are obtained by incrementing the second CSWAOS;
retrieving a second write block from the even sequence;
determining a starting row address in the first bank for the first data group of the second write block from the even sequence based on an offset from the first RSWAES;
determining a starting column address in the first bank for the first data group of the second write block from the even sequence based on the column address of the last word in the first data group of the first write block from the even sequence;
writing the first data group of the second write block from the even sequence into the first bank using the determined starting row and column addresses in the first bank;
determining a starting row address in the second bank for the second data group of the second write block from the even sequence based on the offset from the second RSWAES;
determining a starting column address in the second bank for the second data group of the second write block from the even sequence based on the column address of the last word in the second data group of the first write block from the even sequence;
writing the second data group of the second write block from the even sequence into the second bank using the determined starting row and column addresses in the second bank;
retrieving a second write block from the odd sequence; and
repeating the above steps that are applicable to the second write block from the even sequence with the second write block from the odd sequence using the first and second RSWAOSs and the first and second CSWAOSs.

8. The method of claim 7 further comprising:
upon reaching a first memory boundary in the first bank, for a next write block in the even sequence to be written into the memory, determining a starting row address in the first bank for the first data group of the next write block in the even sequence by incrementing the first RSWAES, and resetting a starting column address in the first bank for the first data group of the next write block in the even sequence to the first CSWAES;
upon reaching a second memory boundary in the second bank, for the next write block in the even sequence to be written into the memory, determining a starting row address in the second bank for the second data group of the next write block in the even sequence by incrementing the second RSWAES, and resetting a starting column address in the second bank for the second data group of the next write block in the even sequence to the second CSWAES;
upon reaching a first bank boundary in the first bank, for a next write block in the odd sequence to be written into the memory, determining a starting row address in the first bank for the first data group of the next write block in the odd sequence by incrementing the first RSWAOS, and resetting a starting column address in the first bank for the first data group of the next write block in the odd sequence to the first CSWAOS; and
upon reaching a second bank boundary in the second bank, for the next write block in the odd sequence to be written into the memory, determining a starting row address in the second bank for the second data group of the next write block in the odd sequence by incrementing the second RSWAOS, and resetting a starting column address in the second bank for the second data group of the next write block in the odd sequence to the second CSWAOS.

9. The method of claim 1, wherein the predetermined number of words in each write block is an integer multiple of one or more factors of the interleaving depth.

10. The method of claim 1, wherein the memory is a synchronous dynamic random access memory (SDRAM); and wherein the total number of columns in the SDRAM is an integer multiple of the interleaving depth.

11. The method of claim 1, wherein the first and second RSWAs are the same; and wherein the first and second CSWAs are the same.

12. The method of claim 1, wherein the first and second RSWAs are not the same; and wherein the first and second CSWAs are not the same.

13. The method of claim 1, wherein the memory is a synchronous dynamic random access memory (SDRAM); and wherein the data bus length of the SDRAM is twice that of a deinterleaving symbol size.

14. The method of claim 1, wherein when the interleaving increment is an even number, a plurality of read blocks are retrieved from the memory in the following manner:
    maintaining a first row start read address (RSRA) and a first column start read address (CSRA) for the first bank;
    maintaining a second RSRA and a second CSRA for the second bank;
    reading a first data group of a first read block from the first bank using the first RSRA and the first CSRA, wherein words in the first data group of the first read block have the same first RSRA and respective column addresses for words in the first data group of the first read block are obtained by using an offset from the first CSRA;
    reading a second data group of the first read block from the second bank using the second RSRA and the second CSRA, wherein words in the second data group of the first read block have the same second RSRA and respective column addresses for words in the second data group of the first read block are obtained by using the offset from the second CSRA;
    determining a starting row address and a starting column address in the first bank for the first data group of a second read block, wherein the starting row address is obtained by decrementing the first RSRA and the starting column address is obtained by incrementing the first CSRA;
    reading the first data group of the second read block from the first bank using the determined starting row and column addresses;
    determining a starting row address and a starting column address in the second bank for the second data group of the second read block, wherein the starting row address is obtained by decrementing the second RSRA and the starting column address is obtained by incrementing the second CSRA; and
    reading the second first data group of the second read block from the second bank using the determined starting row and column addresses.

15. The method of claim 14, wherein when the interleaving increment is an even number, and further comprising:
    upon reaching a bank boundary in the first bank, for a next read block to be read from the memory, determining a starting row address in the first bank for the first data group of the next read block by incrementing the first RSRA, and resetting a starting column address in the first bank for the first data group of the next read block to the first CSRA; and
    upon reaching a bank boundary in the second bank, for the next read block to be read from the memory, determining a starting row address in the second bank for the second data group of the next read block by incrementing the second RSRA, and resetting a starting column address in the second bank for the second data group of the next read block to the second CSRA.

16. The method of claim 14, wherein the offset from the first CSRA is the number of words in the first data group of the first write block.

17. The method of claim 14, wherein the first and second RSRAs are the same; and wherein the first and second CSRAs are the same.

18. The method of claim 14, wherein the first and second RSRAs are not the same; and wherein the first and second CSRAs are not the same.

19. The method of claim 14, wherein the memory is a synchronous dynamic random access memory, and further comprising:
    while the first data group of the first read block is being read from the first bank, issuing a first ACTIVE command to activate a row in the second bank for the second data group of the first read block; and
    while the second data group of the first read block is being read from the second bank, issuing a second ACTIVE command to activate a row in the first bank for the first data group of the second read block.

20. The method of claim 14, wherein the memory is a synchronous dynamic random access memory, and further comprising:
    while the second data group of the second read block is being read from the second bank, issuing an ACTIVE command to activate a row in the first bank in preparation for a write block to be written to the first bank.

21. The method of claim 14, wherein the memory is a synchronous dynamic random access memory, and further comprising:
    after the first data group of the first read block has been read from the first bank, issuing a PRECHARGE command to deactivate a row that is used to store the first data group of the first read block.

22. The method of claim 14, wherein the memory is a synchronous dynamic random access memory, and further comprising:
    after the first data group of the first read block has been read from the first bank, issuing an AUTO PRECHARGE command to deactivate a row that is used to store the first data group of the first read block.

23. The method of claim 14, further comprising:
    reordering the plurality of read blocks retrieved from the memory; and
    recovering the corresponding symbols from the reordered plurality of read blocks.

24. The method of claim 1, wherein when the interleaving increment is an odd number, a plurality of read blocks are retrieved from the memory in the following manner:
    maintaining a first row start read address (RSRA), a first column start read address for even sequence (CSRAES), a first column start read address for odd sequence (CSRAOS) for the first bank;
    maintaining a second RSRA, a second CSRAES and a second CSRAOS for the second bank;
    reading a first data group of a first read block from the first bank using the first RSRA and the first CSRAES, wherein words in the first data group of the first read block have the same first RSRA and respective column addresses for words in the first data group of the first read block are obtained by using an offset from the first CSRAES;

reading a second data group of the first read block from the second bank using the second RSRA and the second CSRAES, wherein words in the second data group of the first read block have the same second RSRA and respective column addresses for words in the second data group of the first read block are obtained by using the offset from the second CSRAES, wherein the first read block belongs to an even sequence;

reading a first data group of a second read block from the first bank using the first RSRA and the first CSRAOS, wherein words in the first data group of the second read block have the same first RSRA and respective column addresses for words in the first data group of the second read block are obtained by using the offset from the first CSRAOS; and reading a second data group of the second read block from the second bank using the second RSRA and the second CSRAOS, wherein words in the second data group of the second read block have the same second RSRA and respective column addresses for words in the second data group of the second read block are obtained by using the offset from the second CSRAOS, wherein the second read block belongs to an odd sequence.

25. The method of claim 24, further comprising:
upon reaching a first memory boundary in the first bank, for a next read block in the even sequence to be read from the memory, determining a starting row address in the first bank for the first data group of the next read block in the even sequence by incrementing the first RSRA, and resetting a starting column address in the first bank for the first data group of the next read block in the even sequence to the first CSRAES;
upon reaching a second memory boundary in the second bank, for the next read block in the even sequence to be read from the memory, determining a starting row address in the second bank for the second data group of the next read block in the even sequence by incrementing the second RSRA, and resetting a starting column address in the second bank for the second data group of the next read block in the even sequence to the second CSRAES;
upon reaching a first bank boundary in the first bank, for a next read block in the odd sequence to be read from the memory, determining a starting row address in the first bank for the first data group of the next read block in the odd sequence by incrementing the first RSRA, and resetting a starting column address in the first bank for the first data group of the next read block in the odd sequence to the first CSRAOS; and
upon reaching a second bank boundary in the second bank, for the next read block in the odd sequence to be read from the memory, determining a starting row address in the second bank for the second data group of the next read block in the odd sequence by incrementing the second RSRA, and resetting a starting column address in the second bank for the second data group of the next read block in the odd sequence to the second CSRAOS.

26. The method of claim 24, further comprising:
reordering the plurality of read blocks retrieved from the memory; and
recovering the corresponding symbols from the reordered plurality of read blocks.

27. The method of claim 1, wherein the device is a deinterleaver and the memory is a synchronous dynamic random access memory.

28. The method of claim 1, wherein the device is an interleaver and the memory is a synchronous dynamic random access memory.

29. The method of claim 1, wherein the memory is a synchronous dynamic random access memory, the memory further having multiple pairs of banks;
wherein the method is similarly applied to each pair of banks as applied to the first and second banks; and
wherein each pair of banks is used to store interleaved data for a corresponding channel.

30. A method for managing interleaved data in connection with a device having a memory, wherein the device is associated with an interleaving increment and an interleaving depth, and the memory has a first bank and a second bank, the method comprising:
dividing a write block into a first data group and a second data group, each data group having a predetermined number of words, each word being made up of a pair of symbols;
when the interleaving increment is an even number, writing the write block into the memory as follows:
writing the first data group of the write block into the first bank using a first next-write row address and a first next-write column address, wherein all words in the first data group of the write block are written into a row identified by the first next-write row address, and wherein the column address for the first word in the first data group of the write block is the first next-write column address and respective column addresses for remaining words in the first data group of the write block are obtained by incrementing the first next-write column address sequentially;
once the first data group of the write block has been written into the first bank, decrementing the first next-write row address and incrementing the first next-write column address in order to provide a starting position for the first data group of a next write block;
writing the second data group of the write block into the second bank using a second next-write row address and a second next-write column address, wherein all words in the second data group of the write block are written into a row identified by the second next-write row address, and wherein the column address for the first word in the second data group of the write block is the second next-write column address and respective column addresses for remaining words in the second data group of the write block are obtained by incrementing the second next-write column address sequentially;
once the second data group of the write block has been written into the second bank, decrementing the second next-write row address and incrementing the second next-write column address in order to provide a starting position for the second data group of the next write block; and
repeating the above steps with the next write block.

31. The method of claim 30 further comprising:
when the interleaving increment is an even number, reading a read block from the memory as follows:
reading the first data group of the read block from the first bank using a first next-read row address and a first next-read column address, wherein all words in the first data group of the read block are read from a row identified by the first next-read row address, and wherein the column address for the first word in the first data group of the read block is the first next-read column address and respective column addresses for the remaining words in the first data group of the read block are obtained by incrementing the first next-read column sequentially with a read-offset;

after the first data group of the read block has been read, decrementing the first next-read row address and incrementing the first next-read column address in order to provide a starting position for the first data group of a next read block;

reading the second data group of the read block from the second bank using a second next-read row address and a second next-read column address, wherein all words in the second data group of the read block are read from a row identified by the second next-read row address, and wherein the column address for the first word in the second data group of the read block is the second next-read column address and respective column addresses for the remaining words in the second data group of the read block are obtained by incrementing the second next-read column sequentially with the read-offset;

after the second data group of the read block has been read, decrementing the second next-read row address and incrementing the second next-read column address in order to provide a starting position for the second data group of the next read block; and repeating the above steps with the next read block.

32. The method of claim 30 further comprising:

when the interleaving increment is an even number, upon reaching a bank boundary in the first bank, for the next write block to be written into the memory, incrementing the first next-write row address to a first new value and resetting the first next-write column address to a first initial value, and upon reaching a bank boundary in the second bank, for the next write block to be written into the memory, incrementing the second next-write row address to a second new value and resetting the second next-write column address to a second initial value.

33. The method of claim 30, wherein the memory is a synchronous dynamic random access memory, and further comprising:

while the first data group of the write block is being written into the first bank, issuing a first ACTIVE command to activate a row identified by the second next-write row address in the second bank; and while the second data group of the write block is being written into the second bank, issuing a second ACTIVE command to activate a row identified by the first next-write row address in the first bank for the first data group of the next write block.

34. The method of claim 30, wherein the memory is a synchronous dynamic random access memory, and further comprising:

while the second data group of the write block is being written into the second bank, issuing an ACTIVE command to activate a row in the first bank in preparation for a read block to be read from the first bank.

35. The method of claim 30, wherein the memory is a synchronous dynamic random access memory, and further comprising:

after the first data group of the write block has been written into the first bank, issuing a PRECHARGE command to deactivate a row that is used to store the first data group of the write block.

36. The method of claim 30, wherein the memory is a synchronous dynamic random access memory, and further comprising:

after the first data group of the write block has been written into the first bank, issuing an AUTO PRECHARGE command to deactivate a row that is used to store the first data group of the write block.

37. The method of claim 30 further comprising:

separating the plurality of write blocks into an even sequence and an odd sequence;

when the interleaving increment is an odd number, writing a write block from the even sequence (even write block) and a write block from the odd sequence (odd write block) into the memory as follows:

writing the first data group of the even write block into the first bank using a first next-even-write row address and a first next-even-write column address, wherein all words in the first data group of the even write block are written into a row identified by the first next-even-write row address, and wherein the column address for the first word in the first data group of the even write block is the first next-even-write column address and respective column addresses for remaining words in the first data group of the even write block are obtained by incrementing the first next-even-write column address sequentially;

once the first data group of the even write block has been written into the first bank, decrementing the first next-even-write row address and incrementing the first next-even-write column address in order to provide a starting position for the first data group of a next even write block;

writing the second data group of the even write block into the second bank using a second next-even-write row address and a second next-even-write column address, wherein all words in the second data group of the even write block are written into a row identified by the second next-even-write row address, and wherein the column address for the first word in the second data group of the even write block is the second next-even-write column address and respective column addresses for remaining words in the second data group of the even write block are obtained by incrementing the second next-even-write column address sequentially;

once the second data group of the even write block has been written into the second bank, decrementing the second next-even-write row address and incrementing the second next-even-write column address in order to provide a starting position for the second data group of the next even write block;

writing the first data group of the odd write block into the first bank using a first next-odd-write row address and a first next-odd-write column address, wherein all words in the first data group of the odd write block are written into a row identified by the first next-odd-write row address, and wherein the column address for the first word in the first data group of the odd write block is the first next-odd-write column address and respective column addresses for remaining words in the first data group of the odd write block are obtained by incrementing the first next-odd-write column address sequentially;

once the first data group of the odd write block has been written into the first bank, decrementing the first next-odd-write row address and incrementing the first next-odd-write column address in order to provide a starting position for the first data group of a next odd write block;

writing the second data group of the odd write block into the second bank using a second next-odd-write row address and a second next-odd-write column address, wherein all words in the second data group of the odd write block are written into a row identified by the second next-odd-write row address, and wherein the column address for the first word in the second data group of the odd write block is the second next-odd-write column address and respective column addresses for remaining words in the second data group of the odd write block are obtained by incrementing the second next-odd-write column address sequentially; and once the second data group of the odd write block has been written into the second bank, decrementing the second next-odd-write row address and incrementing the second next-odd-write column address in order to provide a starting position for the second data group of the next odd write block; and repeating the above steps with the next even write block from the even sequence and the next odd write block from the odd sequence.

38. The method of claim 37 wherein when the interleaving increment is an odd number, a plurality of read blocks are retrieved from the memory in the following manner:

reading the first data group of an even read block from the first bank using a first next-even-read row address and a first next-even-read column address, wherein all words in the first data group of the even read block are read from a row identified by the first next-even-read row address, and wherein the column address for the first word in the first data group of the even read block is the first next-even-read column address and respective column addresses for the remaining words in the first data group of the even read block are obtained by incrementing the first next-even-read column sequentially with a read-offset;

after the first data group of the even read block has been read, decrementing the first next-even-read row address and incrementing the first next-even-read column address in order to provide a starting position for the first data group of a next even read block;

reading the second data group of the even read block from the second bank using a second next-even-read row address and a second next-even-read column address, wherein all words in the second data group of the even read block are read from a row identified by the second next-even-read row address, and wherein the column address for the first word in the second data group of the even read block is the second next-even-read column address and respective column addresses for the remaining words in the second data group of the even read block are obtained by incrementing the second next-even-read column sequentially with the read-offset;

after the second data group of the even read block has been read, decrementing the second next-even-read row address and incrementing the second next-even-read column address in order to provide a starting position for the second data group of the next read block;

reading the first data group of an odd read block from the first bank using a first next-odd-read row address and a first next-odd-read column address, wherein all words in the first data group of the odd read block are read from a row identified by the first next-odd-read row address, and wherein the column address for the first word in the first data group of the odd read block is the first next-odd-read column address and respective column addresses for the remaining words in the first data group of the odd read block are obtained by incrementing the first next-odd-read column sequentially with a read-offset;

after the first data group of the odd read block has been read, decrementing the first next-odd-read row address and incrementing the first next-odd-read column address in order to provide a starting position for the first data group of a next odd read block;

reading the second data group of the odd read block from the second bank using a second next-odd-read row address and a second next-odd-read column address, wherein all words in the second data group of the odd read block are read from a row identified by the second next-odd-read row address, and wherein the column address for the first word in the second data group of the odd read block is the second next-odd-read column address and respective column addresses for the remaining words in the second data group of the even odd block are obtained by incrementing the second next-odd-read column sequentially with the read-offset;

after the second data group of the odd read block has been read, decrementing the second next-odd-read row address and incrementing the second next-odd-read column address in order to provide a starting position for the second data group of the next odd read block; and repeating the above steps with the next even read block and the next odd read block.

39. The method of claim 37 further comprising:

when the interleaving element is an odd number:
upon reaching a first memory boundary in the first bank, for the next even write block to be written into the memory, incrementing the first next-even-write row address to a first new value and resetting the first next-even-write column address to a first even-sequence-column initial value;

upon reaching a second memory boundary in the second bank, for the next even write block to be written into the memory, incrementing the second next-even-write row address to a second new value and resetting the second next-even-write column address to a second even-sequence-column initial value;

upon reaching a first bank boundary in the first bank, for the next odd write block to be written into the memory, incrementing the first next-odd-write row address to the first new value and resetting the first next-odd-write column address to a first initial odd-sequence-column initial value; and upon reaching a second bank boundary in the second bank, for the next odd write block to be written into the memory, incrementing the second next-odd-write row address to the second new value and resetting the second next-odd-write column address to a second odd-sequence-column initial value.

40. The method of claim 31, wherein the interleaving increment is an even number, and further comprising:

upon reaching a bank boundary in the first bank, for the next read block to be read from the memory, incrementing the first next-read row address to a first value, and resetting the first next-read column address to a first initial column value; and upon reaching a bank boundary in the second bank, for the next read block to be read from the memory, incrementing the second next-read row address to a second value, and resetting the second next-read column address to a second initial column value.

41. The method of claim 38, wherein the interleaving increment is an odd number, and further comprising:

upon reaching a first memory boundary in the first bank, for the next even read block to be read from the memory, incrementing the first next-even-read row address to a first new value and resetting the first next-even-read column address to a first even-sequence-column initial value;

upon reaching a second memory boundary in the second bank, for the next even read block to be read from the memory, incrementing the second next-even-read row address to a second new value and resetting the second next-even-read column address to a second even-sequence-column initial value;

upon reaching a first bank boundary in the first bank, for the next odd read block to be read from the memory, incrementing the first next-odd-read row address to the first new value and resetting the first next-odd-read column address to a first odd-sequence-column initial value; and upon reaching a second bank boundary in the second bank, for the next odd read block to be read from the memory, incrementing the second next-odd-read row address to the second new value and resetting the second next-odd-read column address to a second odd-sequence-column initial value.

42. The method of claim 30, wherein the predetermined number of words in each write block is an integer multiple of one or more factor(s) of the interleaving depth.

43. The method of claim 30, wherein the memory is a synchronous dynamic random access memory (SDRAM); and wherein the total number of columns in the SDRAM is a an integer multiple of the interleaving depth.

44. The method of claim 30, wherein the first and second next-write row addresses are the same; and wherein the first and second next-write column addresses are the same.

45. The method of claim 30, wherein the first and second next-write row addresses are not the same; and wherein the first and second next-write column addresses are not the same.

46. The method of claim 30, wherein the memory is a synchronous dynamic random access memory (SDRAM); and wherein the data bus length of the SDRAM is twice that of a deinterleaving symbol size.

47. The method of claim 31, wherein the read-offset is the number of words in the first data group of the write block.

48. The method of claim 31, wherein the first and second next-read row addresses are the same; and wherein the first and second next-read column addresses are the same.

49. The method of claim 31, wherein the first and second next-read row addresses are not the same; and wherein the first and second next-read column addresses are not the same.

50. The method of claim 31, wherein the memory is a synchronous dynamic random access memory, and further comprising:

while the first data group of the read block is being read from the first bank, issuing a first ACTIVE command to activate a row in the second bank for the second data group of the read block; and while the second data group of the first read block is being read from the second bank, issuing a second ACTIVE command to activate a row in the first bank for the first data group of the next read block.

51. The method of claim 31, wherein the memory is a synchronous dynamic random access memory, and further comprising:

while the second data group of the read block is being read from the second bank, issuing an ACTIVE command to activate a row in the first bank in preparation for a write block to be written to the first bank.

52. The method of claim 31, wherein the memory is a synchronous dynamic random access memory, and further comprising:

after the first data group of the read block has been read from the first bank, issuing a PRECHARGE command to deactivate a row that is used to store the first data group of the read block.

53. The method of claim 31, wherein the memory is a synchronous dynamic random access memory, and further comprising:

after the first data group of the read block has been read from the first bank, issuing an AUTO PRECHARGE command to deactivate a row that is used to store the first data group of the read block.

54. The method of claim 31, further comprising:

reordering the plurality of read blocks retrieved from the memory; and recovering the corresponding symbols from the reordered plurality of read blocks.

55. The method of claim 38, further comprising:

reordering the plurality of read blocks retrieved from the memory; and recovering the corresponding symbols from the reordered plurality of read blocks.

56. The method of claim 30, wherein the device is a deinterleaver and the memory is a synchronous dynamic random access memory.

57. The method of claim 30, wherein the device is an interleaver and the memory is a synchronous dynamic random access memory.

58. The method of claim 30, wherein the memory is a synchronous dynamic random access memory, the memory further having multiple pairs of banks;

wherein the method is similarly applied to each pair of banks as applied to the first and second banks; and wherein each pair of banks is used to store interleaved data for a corresponding channel.

* * * * *